(12) United States Patent
Xu et al.

(10) Patent No.: US 9,244,227 B2
(45) Date of Patent: Jan. 26, 2016

(54) POLARIZATION SPLITTER/COMBINER BASED ON A ONE-DIMENSIONAL GRATING COUPLER

(71) Applicant: Futurewei Technologies, Inc., Plano, TX (US)

(72) Inventors: Qianfan Xu, San Jose, CA (US); Xiao Shen, San Bruno, CA (US)

(73) Assignee: Futurewei Technologies, Inc., Plano, TX (US)

( * ) Notice: Subject to any disclaimer, the term of this patent is extended or adjusted under 35 U.S.C. 154(b) by 117 days.

(21) Appl. No.: 14/076,571

(22) Filed: Nov. 11, 2013

(65) Prior Publication Data

US 2015/0131942 A1    May 14, 2015

(51) Int. Cl.
| | |
|---|---|
| G02B 6/34 | (2006.01) |
| G02B 6/26 | (2006.01) |
| G02B 6/42 | (2006.01) |
| G02B 6/30 | (2006.01) |
| G02B 6/124 | (2006.01) |
| G02B 6/27 | (2006.01) |
| G02B 6/125 | (2006.01) |

(52) U.S. Cl.
CPC ........ *G02B 6/34* (2013.01); *G02B 6/124* (2013.01); *G02B 6/2726* (2013.01); *G02B 6/305* (2013.01); *G02B 6/125* (2013.01)

(58) Field of Classification Search
CPC .......... G02B 6/34; G02B 6/126; G02B 6/305; G02B 2006/12107; G02B 5/1871; G02B 6/30; G02B 6/0016; G02B 6/12009; H04J 14/06
USPC .............. 385/11, 28, 37, 40, 50, 129; 398/182–192
See application file for complete search history.

(56) References Cited

U.S. PATENT DOCUMENTS

| | | | | |
|---|---|---|---|---|
| 2005/0094939 | A1* | 5/2005 | Ghiron et al. | 385/36 |
| 2006/0067618 | A1* | 3/2006 | Hill | 385/37 |
| 2010/0322555 | A1 | 12/2010 | Vermeulen et al. | |
| 2012/0155888 | A1* | 6/2012 | Ji et al. | 398/182 |
| 2012/0224810 | A1 | 9/2012 | Doerr | |
| 2012/0296604 | A1* | 11/2012 | Bienstman et al. | 702/172 |

OTHER PUBLICATIONS

Ang, T. W., et al., "Effects of Grating Heights on Highly Efficient Unibond SOI Waveguide Grating Couplers," IEEE Photonics Technology Letters, vol. 12, No. 1, Jan. 2000, pp. 59-61.

(Continued)

*Primary Examiner* — Kaveh Kianni
*Assistant Examiner* — Hung Lam
(74) *Attorney, Agent, or Firm* — Conley Rose, P.C.; Grant Rodolph; Adam J. Stegge (57) ABSTRACT

A grating coupler comprising a semiconductor substrate, a one-dimensional (1D) grating element coupled to the semiconductor substrate, wherein the 1D grating element is adapted to simultaneously couple a first polarization component of an incident optical beam with a transverse electric (TE) waveguide mode in a first propagation direction and a second polarization component of the incident optical beam with a transverse magnetic (TM) waveguide mode in a second propagation direction, and wherein the first propagation direction is opposite of the second propagation direction.

17 Claims, 5 Drawing Sheets

(56) References Cited

OTHER PUBLICATIONS

Bogaerts, W., et al., "A Polarization-Diversity Wavelength Duplexer Circuit in Silicon-On-Insulator Photonic Wires," Interunicersity Microelectronics Center (IMEC), Department of Information Technology, Optics Express, vol. 15, No. 4, Feb. 19, 2007, pp. 1567-1578.
Doerr, C. R., et al., "Monolithic Polarization and Phase Diversity Coherent Receiver in Silicon," Journal of Lightwave Technology, vol. 28, No. 4., Feb. 15, 2010, pp. 520-525.
Taillaert, D., et al., "A Compact Two-Dimensional Grating Coupler Used as a Polarization Splitter," IEEE Photonics Technology Letters, vol. 15, No. 9., Sep. 2003, pp. 1249-1251.
Foreign Communication From a Counterpart Application, PCT Application No. PCT/CN2014/090539, International Search Report dated Jan. 4, 2015, 7 pages.
Foreign Communication From a Counterpart Application, PCT Application No. PCT/CN2014/090539, Written Opinion dated Jan. 4, 2015, 5 pages.

* cited by examiner

POLARIZATION SPLITTER/COMBINER BASED ON A ONE-DIMENSIONAL GRATING COUPLER

CROSS-REFERENCE TO RELATED APPLICATIONS

Not applicable

STATEMENT RECARDING FEDERALLY SPONSORED RESEARCH OR DEVELOPMENT

Not applicable

REFERENCE TO A MICROFICHE APPENDIX

Not applicable

BACKGROUND

Grating couplers as key elements in silicon photonic systems have been used to couple optical signals in and/or out of a planar silicon waveguide fabricated on a chip from or to an out-of-plane optical beam. The out-of-plane optical beam may then be coupled to optical fiber communication systems either directly or through a free-space optical system. One-dimensional (1D) grating couplers, formed by silicon rails and trenches, have been used to couple light of a single polarization. In a fiber optical system, the polarization of light in an optical fiber is random; therefore, light of a single-polarization may not be used on a receiver side to couple light from the optical fiber onto a silicon waveguide. Two-dimensional (2D) grating couplers, formed by a 2D post and/or hole array have been used to simultaneously couple light at two polarizations. The structure of the 2D grating coupler may separate two polarizations from the optical signal and forward each into separate waveguides, which may be referred to as polarization splitting. Each of the polarizations in their respective waveguides may then be separately processed before they are forwarded to a single detector. However, 2D grating couplers may have both a lower coupling efficiency of below −3 decibels (dBs) and a lower optical bandwidth than their 1D grating coupler counterparts. Consequently, 2D grating couplers may limit the performance of optical fiber communication systems.

SUMMARY

In one embodiment, the disclosure includes a grating coupler comprising a semiconductor substrate, a 1D grating element coupled to the semiconductor substrate, wherein the 1D grating element is adapted to simultaneously couple a first polarization component of an incident optical beam with a transverse electric (TE) waveguide mode in a first propagation direction and a second polarization component of the incident optical beam with a transverse magnetic (TM) waveguide mode in a second propagation direction, and wherein the first propagation direction is opposite of the second propagation direction.

In another embodiment, the disclosure includes an apparatus comprising an optical element configured to communicate with a grating coupler via an optical medium, wherein the grating coupler comprises a semiconductor substrate, a 1D grating element coupled to the semiconductor substrate, and an integrated waveguide disposed between the 1D grating element and the substrate, wherein the 1D grating element is adapted to simultaneously couple a first polarization component of an optical beam with a TE waveguide mode in a first propagation direction and a second polarization component of the optical beam with a TM waveguide mode in a second propagation direction, and wherein the first propagation direction is opposite of the second propagation direction.

In another embodiment, the disclosure includes a method comprising coupling a first polarization component of an incident optical beam with a TE waveguide mode in a first propagation direction with a 1D grating element, coupling a second polarization component of the incident optical beam with a TM waveguide mode in a second propagation direction with the 1D grating element, wherein the first propagation direction is opposite of the second propagation direction, and wherein the first polarization component is coupled simultaneously with the second polarization component.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system, apparatus, and/or method for simultaneously coupling a first polarization component of an optical beam with a TE waveguide mode in a first propagation direction and a second polarization component of the incident optical beam with a TM waveguide mode in an opposite second propagation direction with a 1D grating coupler, wherein the first propagation direction is opposite of the second propagation direction. The disclosed 1D grating coupler may provide −2.3 dB coupling efficiency and a 1 dB bandwidth of greater than 60 nm. The disclosed 1D grating coupler may be used to combine two counter-propagating waves comprising orthogonal polarizations to form an out-of-plane optical beam. Interuniversity Microelectronics Center (IMEC) fabrication methods and parameters may be used to fabricate the disclosed 1D grating coupler.

In an embodiment, the disclosed 1D grating coupler may be implemented in an optical receiver within a passive optical network (PON). For example, the PON may be a Next Generation Access (NGA) system, such as a 10 gigabit per second (Gb/s) GPON (or gigabit PON) (e.g., XGPON), which may have a downstream bandwidth of about 10 Gb/s and an upstream bandwidth of about 2.5 Gb/s. Alternatively, the PON may be any Ethernet-based network, such as an EPON (or Ethernet passive optical network) defined by the Institute of Electrical and Electronics Engineers (IEEE) 802.3ah standard, a 10 Gb EPON as defined by the IEEE 802.3av standard, an asynchronous transfer mode PON (APON), a broadband PON (BPON) defined by the International Telecommunications Union (ITU) Telecommunications Standardization Sector (ITU-T) G.983 standard, a GPON defined by the ITU-T G.984 standard, a WDM PON (WPON), or a suitable after-arising technology, all of which are incorporated by reference as if reproduced in their entirety.

Figure 1:
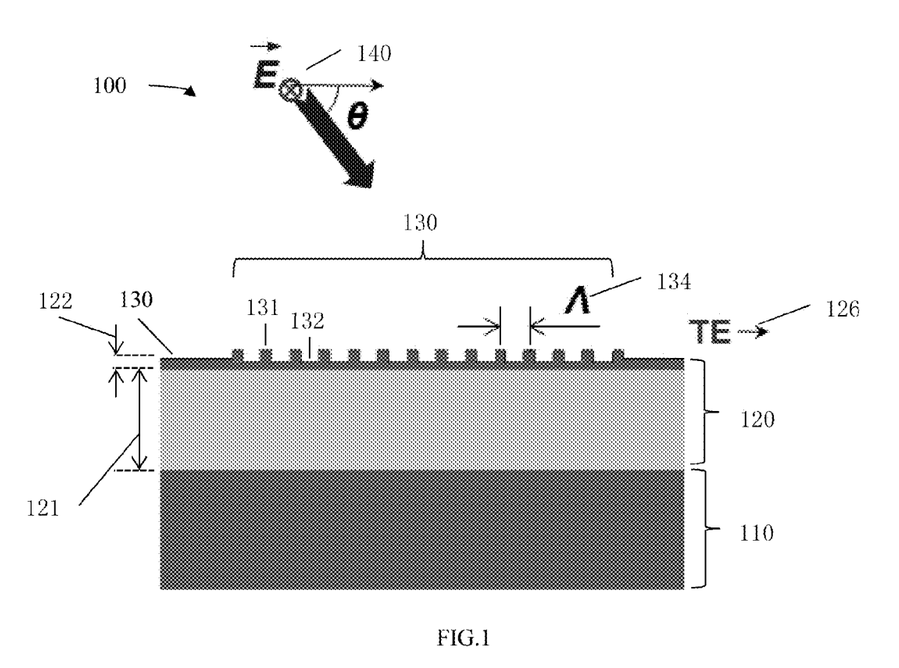
FIG. 1 is a schematic cross-section view of a 1D grating coupler for coupling a single polarization component of an out-of-plane, optical beam with a waveguide polarization mode.

FIG. 1 is a schematic cross-section view of a 1D grating coupler 100 for coupling a single polarization component of an out-of-plane, optical beam with a waveguide polarization mode. Grating coupler 100 comprises a substrate 110, an integrated waveguide 120 formed on the substrate 110, and a 1D grating element 130 coupled to the integrated waveguide 120. Substrate 110 may be a semiconductor chip, such as a silicon (Si) substrate used in the fabrication of integrated circuits and microelectronics. Integrated waveguide 120 may comprise a lower cladding layer 121 and a core layer 122. Lower cladding layer 121 may consist of an oxide material (e.g. silicon dioxide) and core layer 122 may consist of a similar material as substrate 110. Integrated waveguide 120 may be configured to guide a polarization component of an out-of-plane, optical beam coupled to a waveguide polarization mode (e.g. TE or TM) in a propagation direction 126 through total internal reflection. Total internal reflection may occur due to boundary conditions imposed on the guided polarization modes by integrated waveguide 120. The boundary conditions may result from core layer 122 comprising a higher refractive index than both lower cladding layer 121 and a medium forming an interface opposite of the interface formed between core layer 122 and lower cladding layer 121 (e.g. an over cladding layer (not shown)). The guided TE polarization mode may comprise an electric field perpendicular to the direction of propagation. The guided TM polarization mode may comprise an electric field parallel to the direction of propagation. Lower cladding layer 121 may be configured to prevent a field corresponding to the waveguide polarization mode from penetrating into substrate 110. 1D grating element 130 may comprise a plurality of rails 131 and trenches 132 etched into core layer 122. 1D grating element 130 may be configured to couple an out-of-plane, optical beam 140 with integrated waveguide 120. In an embodiment, out-of-plane, optical beam 140 may couple with 1D grating element 130 via free-space propagation and/or an optical fiber. Out-of-plane, optical beam 140 may comprise two orthogonal polarization components (e.g. an s-polarization component and a p-polarization component). Also, the polarization of optical beam 140 in an optical fiber may be randomly polarized, and its polarization may vary over time.

1D grating element 130 may only be able to efficiently couple one of the polarization components to a waveguide polarization mode of integrated waveguide 120. Also, the electric field direction of the TE polarization mode of integrated waveguide 120 may naturally align with the electric field of the s-polarization component. Thus, 1D grating coupler 100 may be considered a polarization sensitive device, and the s-polarization component of the out-of-plane, optical beam 140 may be coupled to the TE polarization mode of integrated waveguide 120. However, the TM polarization mode of integrated waveguide 120 may have an electric field direction that may naturally align with the p-polarization component in a counter-propagating direction.

Figure 2:
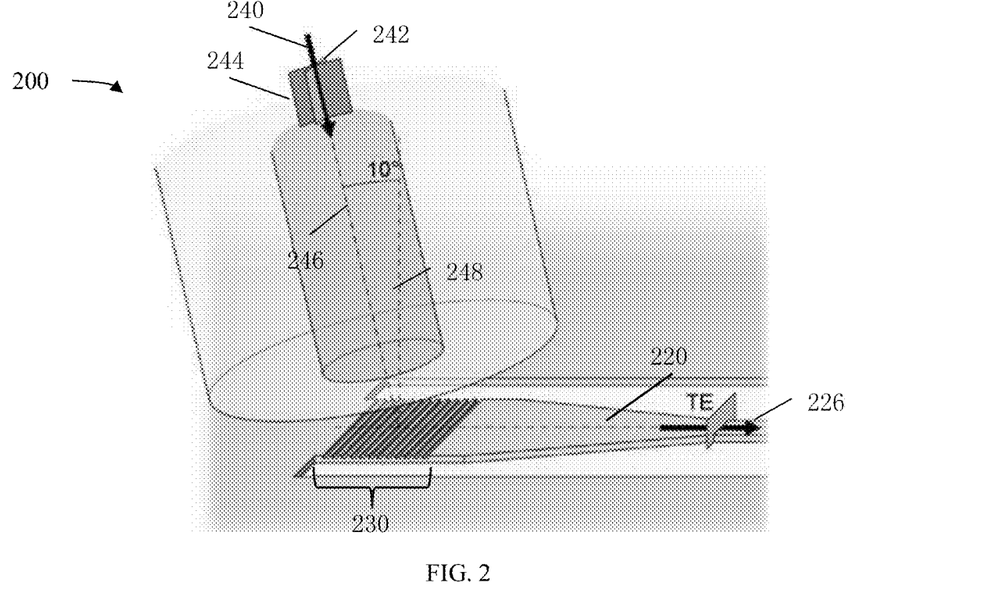
FIG. 2 is an elevated view of a 1D grating coupler for coupling a single polarization component of an out-of-plane, optical beam with a waveguide polarization mode.

FIG. 2 is an elevated view of a 1D grating coupler 200 for coupling a single polarization component of an out-of-plane, optical beam 240 with a waveguide polarization mode. In an embodiment, an out-of-plane, optical beam 240, comprising an s-polarization component 242 and a p-polarization component 244, may be directed towards a 1D grating coupler 200. Out-of-plane, optical beam 240 may be directed at an incident angle 246 with respect to a line 248 normal to the grating coupler surface plane (e.g. 10 degrees (°)). 1D grating coupler 200 can comprise a 1D grating element 230, which may be similar to grating element 130 of FIG. 1. 1D grating element 230 of grating coupler 200 can be used to separate the s-polarization component 242 of the optical beam 240 from the p-polarization component 244. 1D grating element 230 may also couple the s-polarization component 242 into a TE polarization mode of an integrated waveguide 220, which may be similar to grating coupler 100 of FIG. 1, in a propagation direction 226. Integrated waveguide 220 can guide the s-propagation component 242 of the out-of-plane, optical beam 240 along the propagation direction 226 for further processing.

Figure 3:
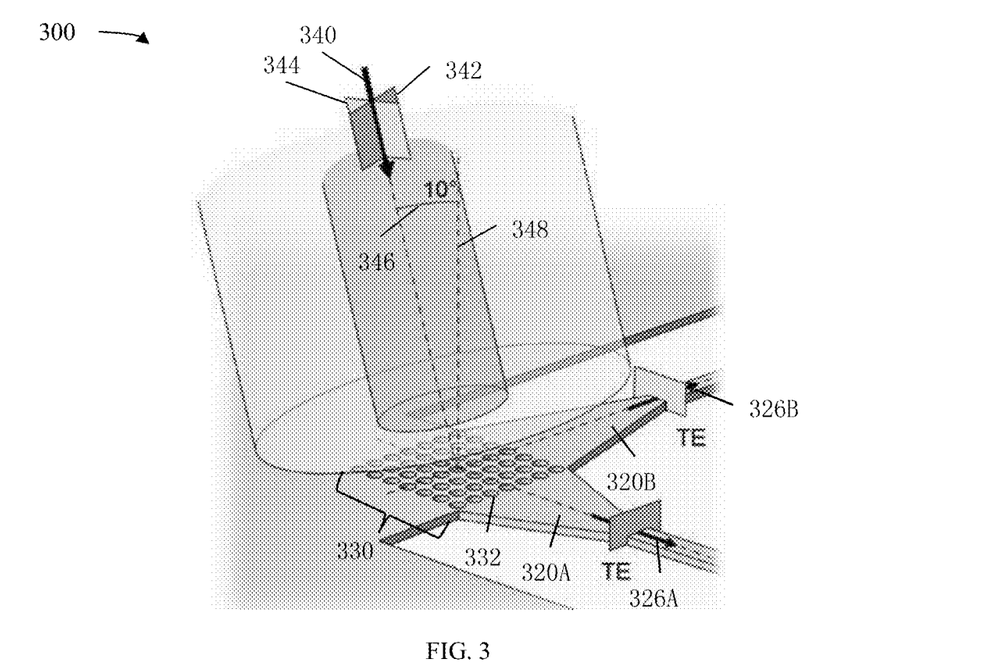
FIG. 3 is an elevated view of a 2D grating coupler for simultaneously coupling two polarization components of an out-of-plane, optical beam with two integrated waveguides.

FIG. 3 is an elevated view of a 2D grating coupler 300 for simultaneously coupling two polarization components of an out-of-plane, optical beam 340 with two integrated waveguides (e.g. first integrated waveguide 320A and second integrated waveguide 320B). In an embodiment, an out-of-plane, optical beam 340, comprising an s-polarization component 342 and a p-polarization component 344, may be directed towards a 2D grating coupler 300. Out-of-plane, optical beam 340 may be directed at an incident angle 346 with respect to a line 348 normal to the grating coupler surface (e.g. 10°). 2D grating coupler 300 may comprise a 2D grating element 330, comprising an array of holes 332 (or alternatively an array of posts (not shown)). 2D grating element 330 can be formed at an intersection of a pair of orthogonal integrated waveguides (e.g. first integrated waveguide 320A and second integrated waveguide 320B). 2D grating element 330 may be configured to separate the s-polarization component 342 of the optical beam 340 from the p-polarization component 344. 2D grating element 330 may further be configured to couple the s-polarization component 342 into a TE polarization mode of the first integrated waveguide 320A in a first propagation direction 326A. Also, 2D grating element 330 may couple the p-polarization component 344 of the optical beam 340 into a TE polarization mode of the second integrated waveguide 320B in a second propagation direction 326B. A person skilled in the art may refer to this process of separating polarization components of an optical beam into a plurality of waveguides as polarization splitting. First integrated waveguide 320A and second integrated waveguide 320B may guide their respective polarization components of the out-of-plane, optical beam 340 along their respective propagation directions to be separately processed further before they are sent to a detector. 2D grating couplers (e.g. 2D grating coupler 300) may experience lower coupling efficiencies of less than 3.5 dB and reduced 1 dB bandwidths (e.g. less than 40 nm) than 1D grating couplers (e.g. 1D grating coupler 200).

Figure 4A:
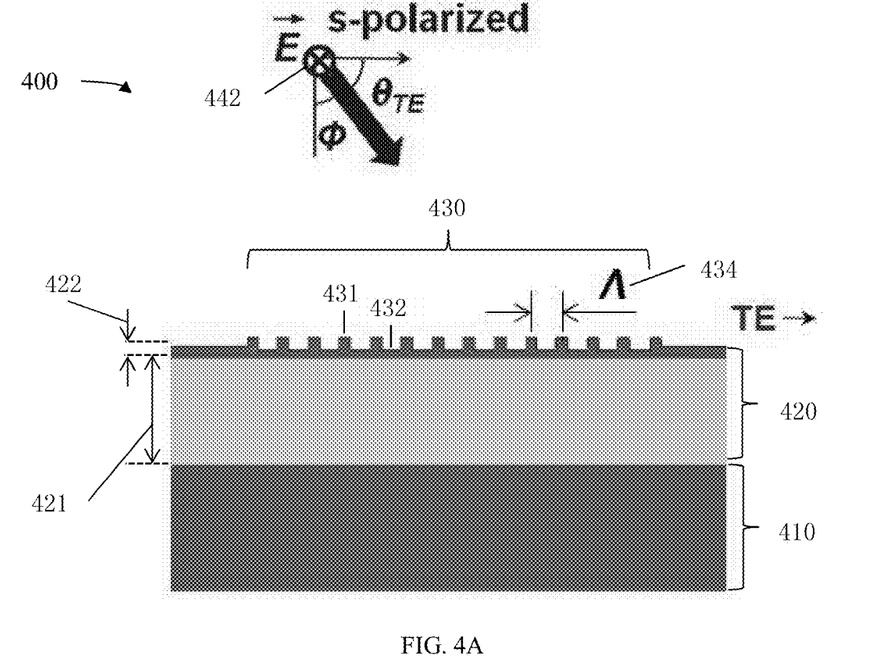
FIG. 4A illustrates a side view of an s-polarization component of an out-of-plane, optical beam incident on an embodiment of the disclosed grating coupler.
Figure 4B:
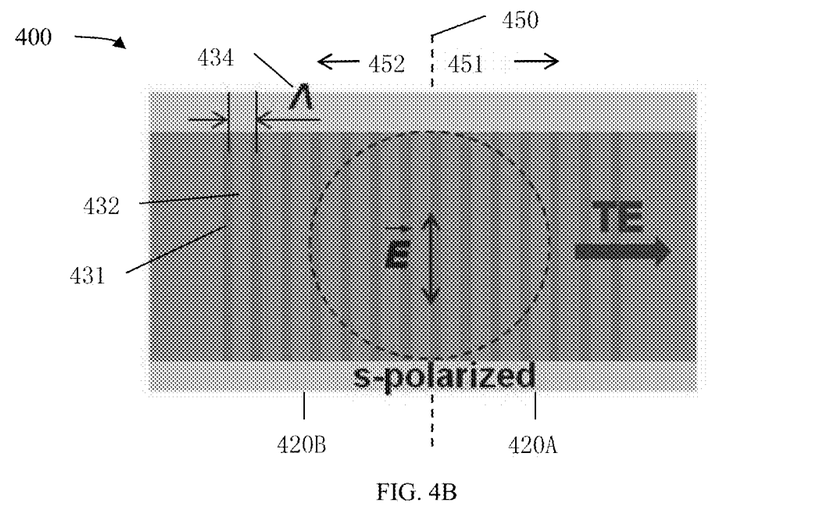
FIG. 4B illustrates a top view of the s-polarization component incident on the embodiment of FIG. 4A.
Figure 4C:
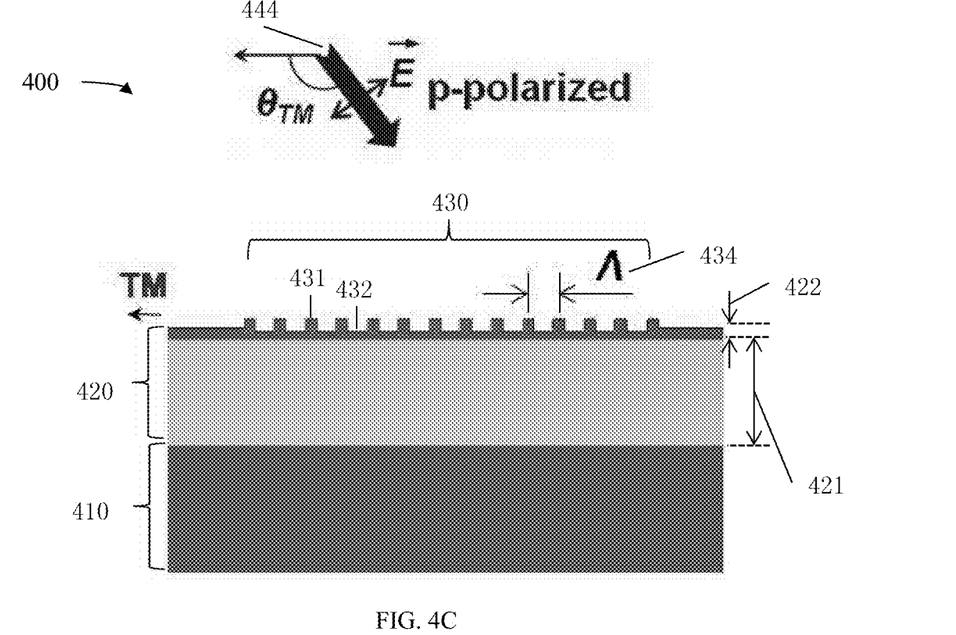
FIG. 4C illustrates a side view of a p-polarization component of the out-of-plane, optical beam incident on the embodiment of FIG. 4A.
Figure 4D:
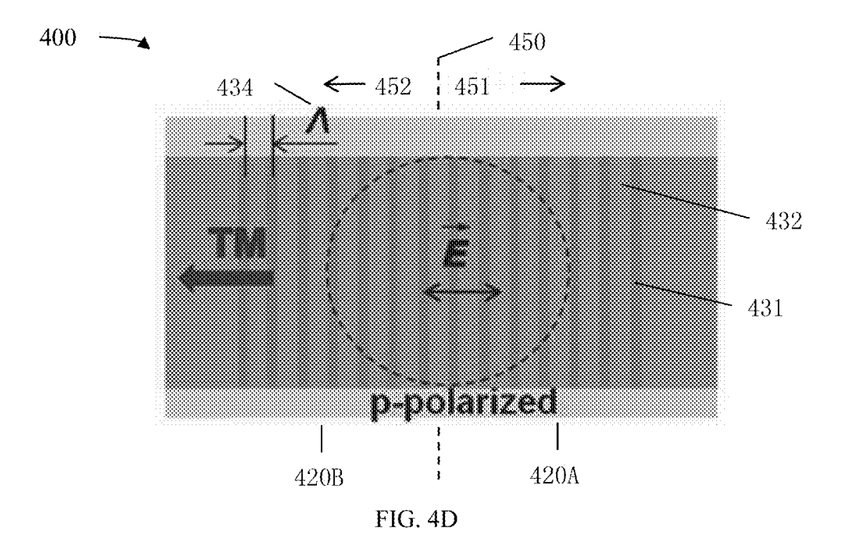
FIG. 4D illustrates a top view of the p-polarization component incident on the embodiment of FIG. 4A.

FIGS. 4A-4D illustrate an embodiment of a 1D grating coupler 400 for simultaneously coupling two polarization components of an out-of-plane, optical beam incident with separate integrated waveguides. FIG. 4A illustrates a side view of an s-polarization component 442 of the out-of-plane, optical beam incident on an embodiment of a 1D grating coupler 400. FIG. 4B illustrates a top view of the s-polarization component 442 incident on the embodiment of FIG. 4A. FIG. 4C illustrates a side view of a p-polarization component 444 of the out-of-plane, optical beam incident on the embodiment of FIG. 4A. FIG. 4D illustrates a top view of the p-polarization component 444 incident on the embodiment of FIG. 4A. 1D grating coupler 400 may be fabricated using similar process parameters and similar layer thickness as employed by IMEC. In an embodiment, 1D grating coupler 400 may be fabricated through such techniques as liquid-phase epitaxy (LPE), vapor-phase epitaxy (VPE), and/or molecular-beam epitaxy (MBE).

In FIGS. 4A-4D, 1D grating coupler 400 may comprise a substrate 410, an integrated waveguide 420 formed on the substrate 410, and a grating element 430 coupled to integrated waveguide 420. Substrate 410 may be substantially similar to substrate 110 of FIG. 1. As shown in FIGS. 4B and 4D, integrated waveguide 420 may comprise, a first integrated waveguide 420A in a first direction 451 from line 450 and a second integrated waveguide 420B in a second direction 452 from line 450, which may be opposite of first direction 451. First integrated waveguide 420A and second integrated waveguide 420B may both comprise a lower cladding layer 421 and a core layer 422, which may be similar to lower cladding layer 121 and core layer 122. Grating element 430 may be configured to separate the s-polarization component 442 of an optical beam from the p-polarization component 444. Grating element 430 may be further configured to simultaneously couple the s-polarization component 442 into a TE polarization mode of first integrated waveguide 420A propagating in the first direction 451 and the p-polarization component 444 into a TM polarization mode of second integrated waveguide 420B propagating in the second direction 452. As shown in FIG. 4A, s-polarization component 442 may comprise an electric field direction that naturally matches the TE polarization mode electric field shown in FIG. 4B. Also, as shown in FIG. 4C, p-polarization component 444 may comprise an electric field direction that naturally matches the TM polarization mode electric field shown in FIG. 4D. Efficient coupling of a specific polarization component with a corresponding waveguide polarization mode, may be realized when:

Equation 1

$$n_c \cos\theta = n_{\it eff} - \frac{\lambda}{\Lambda} \quad (1)$$

Where:
$\eta_c$=an upper cladding refractive index
$\theta$=an incident light tilt angle
$\eta_{\it eff}$=a waveguide effective index
$\lambda$=an incident light wavelength $\Lambda$=a grating period Furthermore, a diffraction angle corresponding to the TE polarization mode of an integrated waveguide ($\theta_{TE}$) may not be the same as a diffraction angle corresponding to the TM polarization mode of the integrated waveguide ($\theta_{TM}$). This difference between $\theta_{TE}$ and $\theta_{TM}$ may correspond to different effective indices for the TE and TM polarization modes (i.e. $\eta_{\it eff}^{TE}$ and $\eta_{\it eff}^{TM}$, respectively). Simultaneously coupling the s-polarization and p-polarization components of the out-of-plane optical beam to counter-propagating TE and TM polarization modes of integrated waveguide 420 may be achieved when:

Equations 2 and 3

$$\theta_{TE}+\theta_{TM}=180° \quad (2)$$

Where:
$\theta_{TE}$=a diffraction angle for a TE waveguide polarization mode of an out-of-plane optical beam
$\theta_{TM}$=a diffraction angle for a TM waveguide polarization mode of the out-of-plane optical beam $$\phi = \frac{(\theta_{TE} + \theta_{TM})}{2} \quad (3)$$

Where:
$\Phi$=an incident angle of the out-of-plane optical beam with respect to a line normal to the grating coupler surface This relationship may be realized when grating element 430 comprises a grating period 434 defined by:

Equation 4

$$\Lambda = \frac{2\lambda}{n_{\it eff}^{TE} + n_{\it eff}^{TM}} \quad (4)$$

Where:
$\eta_{\it eff}^{TE}$=a TE polarization waveguide effective index
$\eta_{\it eff}^{TM}$=a TM polarization waveguide effective index As shown by equations 3 and 4, grating period 434 may be independent of the out-of-plane, optical beam incident angle. Also, grating period 434 may be designed according to the wavelength of the out-of-plane, optical beam being coupled.

Process variations of one or more structural parameters of grating element 430 may result in both $\eta_{\it eff}^{TE}$ and $\eta_{\it eff}^{TM}$ shifting in tandem. For example, fabrication imperfections varying a layer thickness of grating element 430, a width of rails 431, or an etch depth of trenches 432 may result in shifts for both $\eta_{\it eff}^{TE}$ and $\eta_{\it eff}^{TM}$. Grating period 434 may still simultaneously couple both polarization components of an out-of-plane, optical beam at a different wavelength to counter-propagating waveguide polarization modes notwithstanding such variations. In an embodiment, grating element 430 may be apodized by varying an occupation ratio and/or a spatial period in each section of the grating element to optimize the shape of a free-space optical beam. In some embodiments, varying the incident angle of the out-of-plane, optical beam may not compensate for a wavelength shift resulting from process variations. The transmission spectra of the TE and TM waveguide polarization modes may shift in opposite directions in these embodiments.

Simultaneously coupling two orthogonal polarization components of an out-of-plane, optical beam may reduce the polarization sensitivity of the disclosed 1D grating coupler 400. As a result, 1D grating coupler 400 may be used for polarization diversity coupling and/or polarization multiplexing. In an embodiment, polarization multiplexing may be used to combine two groups of optical channels, which may double the capacity of an optical fiber without introducing wavelength sensitive elements.

Figure 5:
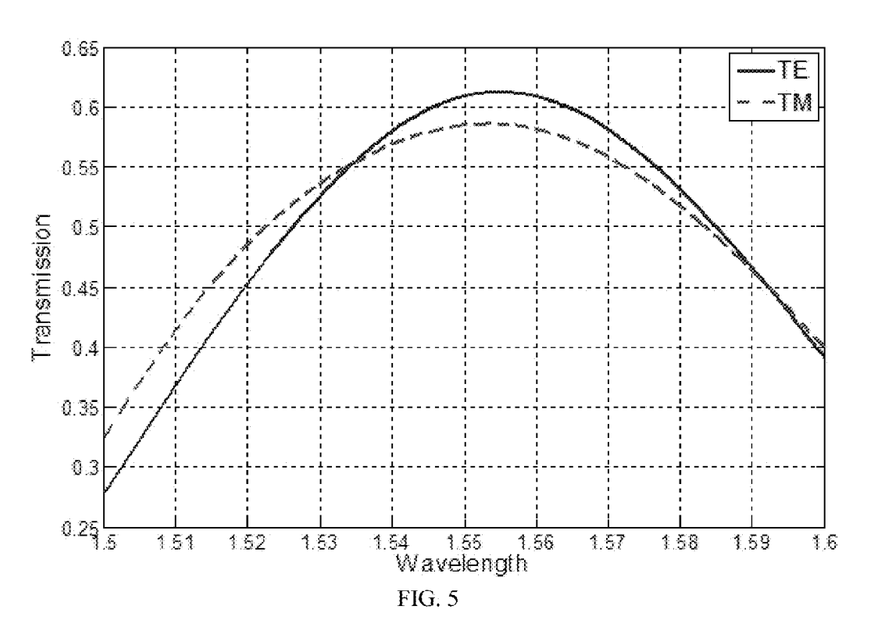
FIG. 5 shows the simulated TE and TM mode transmission spectra for an embodiment of the disclosed grating coupler with a 650 nanometer (nm) grating period.
Figure 6:
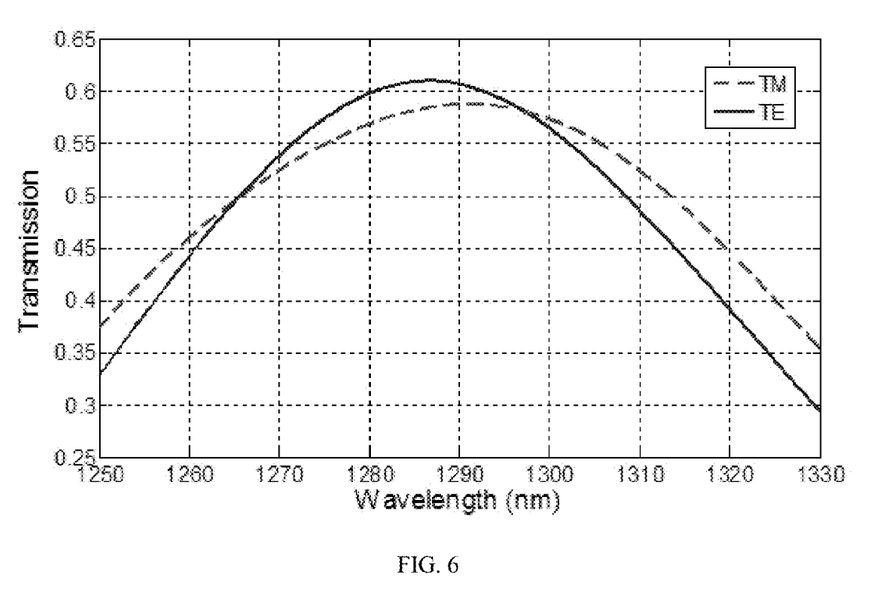
FIG. 6 shows the simulated TE and TM mode transmission spectra for an embodiment of the disclosed grating coupler with a 520 nm grating period.

FIGS. 5 and 6 show the transmission spectrum results from a three-dimensional (3D) finite-difference time-domain (FDTD) simulation of an embodiment of the disclosed grating coupler, e.g., 1D grating coupler 400 of FIGS. 4A-4D.

FIG. 5 shows the simulated TE and TM waveguide polarization mode transmission spectra for an embodiment of the disclosed grating coupler with a 650 nm grating period. In FIG. 5, the y-axis represents the percentage of an optical beam polarization component coupled to a corresponding waveguide polarization mode and the x-axis represents a wavelength measured in micrometers (μm). The grating coupler embodiment of FIG. 5 comprises a grating height of 380 nm, an etch depth of 220 nm, an occupation ratio for the silicon rails of 36%. A waveguide comprising a height of 220 nm and a width of 10 μm, was coupled to the grating coupler. A 1550 nm Gaussian optical beam with a waist radius of 6 μm and an incident angle of 13.4° with respect to a line normal to the grating coupler surface was used for the simulation. As shown, a peak maxima centered at approximately 1550 nm of a TE waveguide polarization mode provides an approximate −2.1 dB coupling efficiency with a 1 dB bandwidth of 62.5 nm. Also, a peak maxima centered around 1550 nm of a TM waveguide polarization mode provides an approximate −2.3 dB coupling efficiency with a 1 dB bandwidth of 73 nm. FIG. 5 also shows that the disclosed grating coupler provides a 3 dB bandwidth that fully encompasses a commonly used wavelength range for photonics work (C-band), which spans from 1530 nm to 1565 nm and may be used for long-range optical communications.

FIG. 6 shows the simulated TE and TM waveguide polarization mode transmission spectra for an embodiment of the disclosed grating coupler with a 520 nm grating period. In FIG. 6, the y-axis represents the percentage of an optical beam polarization component coupled to a corresponding waveguide polarization mode and the x-axis represents a wavelength measured in nm. The grating coupler embodiment of FIG. 6 comprises a grating height of 380 nm, an etch depth of 220 nm, an occupation ratio for the silicon rails of 35%. A waveguide, comprising a height of 220 nm and a width of 9 μm, was coupled to the grating coupler. A Gaussian optical beam with a waist radius of 6 μm and an incident angle of 13.4° with respect to a line normal to the grating coupler surface was used for the simulation. As shown, a peak maxima centered around 1290 nm for the TE waveguide polarization mode provides an approximate −2.15 dB coupling efficiency with a 1 dB bandwidth of 46 nm. Also, a peak coupling efficiency of the TM waveguide polarization mode is approximately −2.3 dB with a 1 dB bandwidth of 56.5 nm. FIG. 6 also shows that the disclosed grating coupler provides a 3 dB bandwidth of approximately 42 nm around 1300 nm, which may be used for short-range optical communications.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4 , etc.; greater than 0.10 includes 0.11, 0.12, 0.6 , etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:
1. A grating coupler comprising:
a semiconductor substrate;
a one-dimensional (1D) grating element coupled to the semiconductor substrate, wherein the 1D grating element simultaneously couples a first polarization component of an incident optical beam with a transverse electric (TE) waveguide mode in a first propagation direction and a second polarization component of the incident optical beam with a transverse magnetic (TM) waveguide mode in a second propagation direction, wherein the 1D grating element comprises a grating period, wherein the grating period (Λ) is determined by:

$$\Lambda = \frac{2\lambda}{n_{eff}^{TE} + n_{eff}^{TM}},$$

wherein λ is a center wavelength of the incident optical beam, wherein $\eta_{eff}^{TE}$ is an effective index of the TE waveguide mode, and wherein $\eta_{eff}^{TM}$ is an effective index of the TM waveguide mode, and wherein the first propagation direction is opposite of the second propagation direction.

2. The grating coupler of claim 1, wherein the TE waveguide mode comprises a first diffraction angle, wherein the TM waveguide mode comprises a second diffraction angle, and wherein a sum of the first diffraction angle and the second diffraction angle equals about 180 degrees.

3. The grating coupler of claim 1, further comprising an integrated waveguide disposed between the 1D grating element and the semiconductor substrate, and wherein the integrated waveguide comprises a lower cladding layer and a core layer coupled to the lower cladding layer.

4. The grating coupler of claim 3, wherein the lower cladding layer comprises silicon dioxide, and wherein the core layer comprises silicon.

5. The grating coupler of claim 1, wherein the center wavelength is in a range of about 1100 nanometers (nm) to 2500 nm.

6. The grating coupler of claim 5, wherein the grating coupler is adapted to provide a 1 decibel (dB) bandwidth of greater than 62.5 nm.

7. The grating coupler of claim 1, wherein the 1D grating element further comprises an occupation ratio and a spatial period, and wherein the occupation ratio, the spatial period, or a combination thereof may be varied.

8. The grating coupler of claim 7, wherein the grating coupler is adapted to provide a 1 dB bandwidth of greater than 46 nm.

9. The grating coupler of claim 1, wherein the grating coupler is adapted to combine a TE polarized signal from the first propagation direction with a TM polarized signal from the second propagation direction into a single optical beam.

10. An apparatus comprising:
an optical element configured to communicate with a grating coupler via an optical medium,
wherein the grating coupler comprises:
a semiconductor substrate;
a one-dimensional (1D) grating element coupled to the semiconductor substrate, with the 1D grating element comprises a grating period (Λ) determined by:

$$\Lambda = \frac{2\lambda}{n_{eff}^{TE} + n_{eff}^{TM}},$$

wherein λ is a center wavelength of the incident optical beam, wherein $\eta_{eff}^{TE}$ is an effective index of the TE waveguide mode, and wherein $\eta_{eff}^{TM}$ an effective index of the TM waveguide mode an integrated waveguide disposed between the 1D grating element and the semiconductor substrate, wherein the 1D grating element simultaneously couples a first polarization component of an incident optical beam with a transverse electric (TE) waveguide mode in a first propagation direction and a second polarization component of the incident optical beam with a transverse magnetic (TM) waveguide mode in a second propagation direction, and wherein the first propagation direction is opposite of the second propagation direction.

11. The apparatus of claim 10, wherein the optical element is an optical receiver, wherein the optical receiver receives the incident optical beam from the grating coupler, and wherein the incident optical beam is formed by the grating coupler combining a TE polarized signal from the first propagation direction with a TM polarized signal from the second propagation direction.

12. The apparatus of claim 10, wherein the optical element is an optical transmitter configured to transmit the incident optical beam to the grating coupler.

13. The apparatus of claim 10, wherein the optical medium is an optical fiber.

14. The apparatus of claim 10, wherein the optical medium is a free-space optical system.

15. The apparatus of claim 10, wherein the TE waveguide mode comprises a first diffraction angle, wherein the TM waveguide mode comprises a second diffraction angle, and wherein a sum of the first diffraction angle and the second diffraction angle equals about 180 degrees.

16. A method comprising:
coupling a first polarization component of an incident optical beam with a transverse electric (TE) waveguide mode in a first propagation direction with a one-dimensional (1D) grating element;
coupling a second polarization component of the incident optical beam with a transverse magnetic (TM) waveguide mode in a second propagation direction with the 1D grating element, wherein the first propagation direction is opposite of the second propagation direction, and wherein the first polarization component is coupled simultaneously with the second polarization component,
wherein the 1D grating element comprises a grating period (Λ) determined by:

$$\Lambda = \frac{2\lambda}{n_{eff}^{TE} + n_{eff}^{TM}},$$

wherein λ is a center wavelength of the incident optical beam, wherein $\eta_{eff}^{TE}$ is an effective index of the TE waveguide mode, and wherein $\eta_{eff}^{TM}$ is an effective index of the TM waveguide mode.

17. The method of claim 16, wherein the TE waveguide mode comprises a first diffraction angle, wherein the TM waveguide mode comprises a second diffraction angle, and wherein a sum of the first diffraction angle and the second diffraction angle equals about 180 degrees.

* * * * *